(12) United States Patent
Dai et al.

(10) Patent No.: US 10,429,541 B2
(45) Date of Patent: Oct. 1, 2019

(54) RECONSTRUCTING OPTICAL SPECTRA USING INTEGRATED COMPUTATIONAL ELEMENT STRUCTURES

(71) Applicant: Halliburton Energy Services, Inc., Houston, TX (US)

(72) Inventors: Bin Dai, Spring, TX (US); Chris Jones, Hil, TX (US); Dingding Chen, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/736,570

(22) PCT Filed: Jul. 29, 2015

(86) PCT No.: PCT/US2015/042735
§ 371 (c)(1),
(2) Date: Dec. 14, 2017

(87) PCT Pub. No.: WO2017/019072
PCT Pub. Date: Feb. 2, 2017

(65) Prior Publication Data
US 2018/0143344 A1    May 24, 2018

(51) Int. Cl.
*G01V 8/02* (2006.01)
*E21B 49/00* (2006.01)
(Continued)

(52) U.S. Cl.
CPC .............. *G01V 8/02* (2013.01); *E21B 47/102* (2013.01); *E21B 49/00* (2013.01); *E21B 49/082* (2013.01);
(Continued)

(58) Field of Classification Search
None
See application file for complete search history.

(56) References Cited

U.S. PATENT DOCUMENTS

| 2009/0086205 A1 | 4/2009 | Grun et al. |
| 2012/0082362 A1 | 4/2012 | Diem et al. |

(Continued)

FOREIGN PATENT DOCUMENTS

| JP | 11-311573 | 11/1999 |
| WO | WO 2014/123544 A1 | 8/2014 |

OTHER PUBLICATIONS

International Search Report and the Written Opinion of the International Search Authority, or the Declaration, dated Apr. 25, 2016, PCT/US2015/042735, 18 pages, ISA/KR.

(Continued)

*Primary Examiner* — Yara B Green
(74) *Attorney, Agent, or Firm* — Haynes and Boone, LLP

(57) ABSTRACT

Two or more Integrated Computational Element ("ICE") structures are designed and utilized in an optical computing device to combinatorily reconstruct spectral patterns of a sample. To design the ICE structures, principal component analysis ("PCA") loading vectors are derived from training spectra. Thereafter, two or more ICE structures having spectral patterns that match the PCA loading vectors are selected. The selected ICE structures may then be fabricated and integrated into an optical computing device. During operation, the ICE structures are used to reconstruct high resolution spectral data of the samples which is utilized to determine a variety of sample characteristics.

15 Claims, 8 Drawing Sheets

(51) Int. Cl.
*E21B 47/10* (2012.01)
*E21B 49/08* (2006.01)
*E21B 47/06* (2012.01)

(52) U.S. Cl.
CPC ....... *E21B 47/065* (2013.01); *E21B 2049/085* (2013.01)

(56) References Cited

U.S. PATENT DOCUMENTS

| | | | |
|---|---|---|---|
| 2014/0255598 A1 | 9/2014 | Simcock et al. | |
| 2015/0369043 A1* | 12/2015 | Pelletier | G01J 3/42 356/416 |
| 2016/0018339 A1* | 1/2016 | Perkins | G01N 33/1833 73/61.48 |
| 2016/0282509 A1* | 9/2016 | Perkins | G02B 27/0012 |
| 2017/0176324 A1* | 6/2017 | Perkins | G01N 21/25 |

OTHER PUBLICATIONS

Jung, "Principal Component Analysis Based Two-Dimensional (PCA-2D) Correlation Spectroscopy: PCA Denoising for 2D Correlation Spectroscopy," Bulletin of the Korean Chemical Society, vol. 24, No. 9, 2003, pp. 1345-1350.
Nelson et al., "Multivariate Optical Computation of Predictive Spectroscopy", *Analytical Chemistry*, 1998, vol. 70, No. 1, pp. 73-82.

* cited by examiner

RECONSTRUCTING OPTICAL SPECTRA USING INTEGRATED COMPUTATIONAL ELEMENT STRUCTURES

PRIORITY

The present application is a U.S. National Stage patent application of International Patent Application No. PCT/US2015/042735, filed on Jul. 29, 2015, the benefit of which is claimed and the disclosure of which is incorporated herein by reference in its entirety.

FIELD OF THE DISCLOSURE

The present disclosure relates generally to Integrated Computational Elements ("ICE") structures and, more specifically, to ICE structures having spectral functions that combinatorily reconstruct optical spectra of a sample.

BACKGROUND

In recent years, optical computing techniques have been developed for applications in the oil and gas industry. One such technique has involved the determination of the optical density (i.e., absorbance) of downhole fluids—which can inform the operators of a variety of characteristics of the downhole fluid. However, it is very difficult to record a high resolution optical spectrum of downhole fluid in the spectral region of 400 to 1100 nm, mainly due to two reasons: First, the harsh, high temperature, high pressure downhole conditions prevent the downhole use of sophisticated grating-based or Fourier Transform-based instruments capable of providing high resolution spectrums. Second, since the optical density of oil in the visible and short near infrared spectral region is high (highly opaque), high powered light sources and sensitive detectors are needed to resolve the spectra, which increase the downhole power requirements and render the tool less rugged and robust.

To address these issues to date, the oil and gas industry has relied upon the use of narrow band optical filters because of their resilience in the downhole environment. However, these narrow band optical filters can only record very low resolution spectrums (i.e., four or less optical channels across the spectrum). Such low resolution data spectra fail to provide the amount of data needed to make highly accurate measurements of the downhole environment.

DESCRIPTION OF ILLUSTRATIVE EMBODIMENTS

Figure 1:
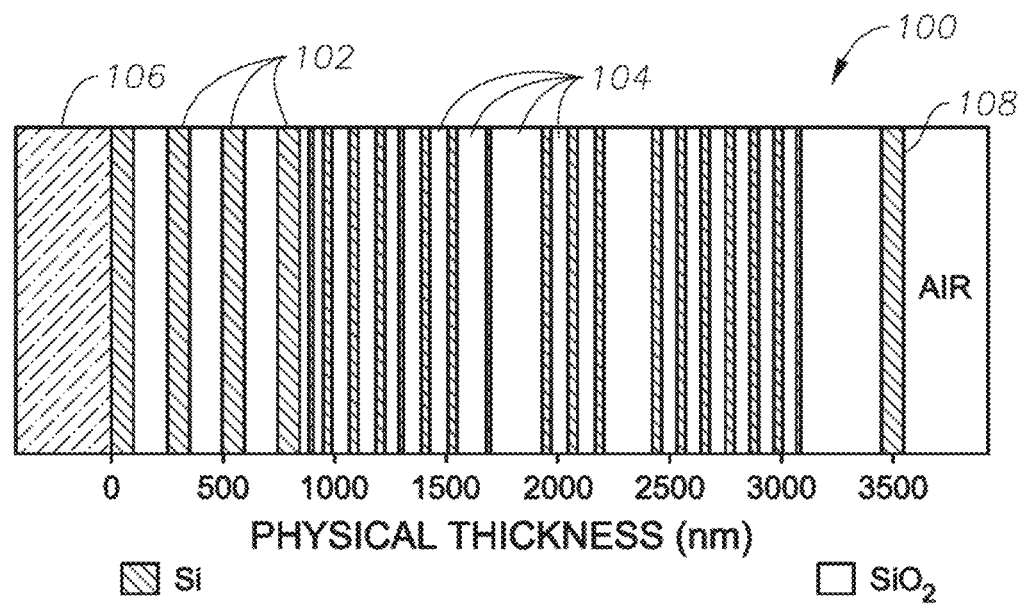
FIG. 1 illustrates an illustrative ICE structure which may be fabricated in accordance to embodiments of the present disclosure.

Illustrative embodiments and related methodologies of the present disclosure are described below as they might be employed in a method for ICE design, fabrication and use. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

Illustrative embodiments of the present disclosure are directed to design techniques for broadband ICE structures having predefined transmission spectral patterns. Two or more of the designed ICE structures are then utilized in an optical computing device to combinatorily reconstruct spectral patterns of a sample. To summarize a generalized design method, optical training spectra of one or more samples are obtained. Principal component analysis ("PCA") loading vectors are then derived which correspond to the training spectra. Thereafter, two or more ICE structures having spectral patterns that match the PCA loading vectors are selected. The selected ICE structures may then be fabricated and integrated into an optical computing device useful in a variety of applications. During operation, the two or more ICE structures are used to reconstruct high resolution spectra data of the samples, which may then be output as optical density data or sample composition data.

As previously stated, the illustrative ICE structures described herein may be utilized in optical computing devices. An optical computing device is a device configured to receive an input of electromagnetic radiation from a substance or sample of the substance and produce an output of electromagnetic radiation from a processing element. The processing element may be, for example, an ICE structure. Fundamentally, optical computing devices utilize optical elements to perform calculations, as opposed to the hardwired circuits of conventional electronic processors. When electromagnetic radiation interacts with a substance, unique physical and chemical information about the substance is encoded in the electromagnetic radiation that is reflected from, transmitted through, or radiated from the sample. This information is often referred to as the substance's spectral "fingerprint." Thus, the optical computing device, through use of the ICE structure, is capable of extracting the information of the spectral fingerprint of multiple characteristics or analytes within a substance and converting that information into a detectable output regarding the overall properties of a sample.

Referring to FIG. 1, illustrated is an illustrative ICE structure 100 which may be fabricated through utilization of the illustrative design processes described herein. ICE structure 100 may include a plurality of alternating layers 102 and 104, such as, for example, silicon (Si) and quartz ($SiO_2$), respectively. Other non-limiting examples of layer material include niobium, germanium and Germania, MgF, SiO, and other high and low index materials, although persons of ordinary skill in the art having the benefit of this disclosure will understand that these layers consist of materials whose index of refraction is high and low, respectively. The layers 102, 104 may be strategically deposited on an optical substrate 106. In some embodiments, the optical substrate 106 is BK-7 optical glass. In other embodiments, the optical substrate 106 may be other types of optical substrates, such as quartz, sapphire, silicon, germanium, zinc selenide, zinc sulfide, or various plastics such as polycarbonate, polymethalmethacrylate PMMA), polyvinylchloride (PVC), diamond, ceramics, etc., as known in the art. At the opposite end (e.g., opposite the optical substrate 106), the ICE structure 100 may include a layer 108 that is generally exposed to the environmental air surrounding the device or installation. The number of layers 102, 104 and the thickness of each layer 102, 104 may be determined from the spectral attributes acquired from a spectroscopic analysis of a characteristic of the sample substance using a conventional spectroscopic instrument.

The spectrum of interest of a given characteristic of a sample typically includes any number of different wavelengths. It should be understood that the illustrative ICE structure 100 in FIG. 1 does not in fact represent any particular characteristic of a given sample, but is provided for purposes of illustration only. Consequently, the number of layers 102, 104 and their relative thicknesses, as shown in FIG. 1, bear no correlation to any particular characteristic of a given sample. Nor are the layers 102, 104 and their relative thicknesses necessarily drawn to scale, and therefore should not be considered to limit the present disclosure. Moreover, those skilled in the art having the benefit of this disclosure will readily recognize that the materials that make up each layer 102, 104 may vary, depending on the application, cost of materials, and/or applicability of the material to the sample substance. For example, the layers 102, 104 may be made of, but are not limited to, silicon, quartz, germanium, water, combinations thereof, or other materials of interest. Furthermore, those same skilled persons will realize that the physical thicknesses of the layers 102 are illustrative in nature and, thus, may be altered as desired.

The multiple layers 102, 104 exhibit different refractive indices. By properly selecting the materials of the layers 102, 104 and their relative thicknesses and spacing, the illustrative ICE structure 100 may be configured to selectively pass/reflect/refract predetermined fractions of light (i.e., electromagnetic radiation) at different wavelengths, also referred to herein as the ICE structure's spectral pattern. As described herein, the number of layers and layer thicknesses of the ICE structure are designed such that they have a transmission spectral pattern that, in combination, reconstruct spectral patterns of the sample, thus providing high resolution data useful to determine sample spectral densities (absorbance, transmittance, etc.) or compositions. Accordingly, selection of number of layers, layer thickness and spacing are critically important to the ICE design process.

Figure 2:
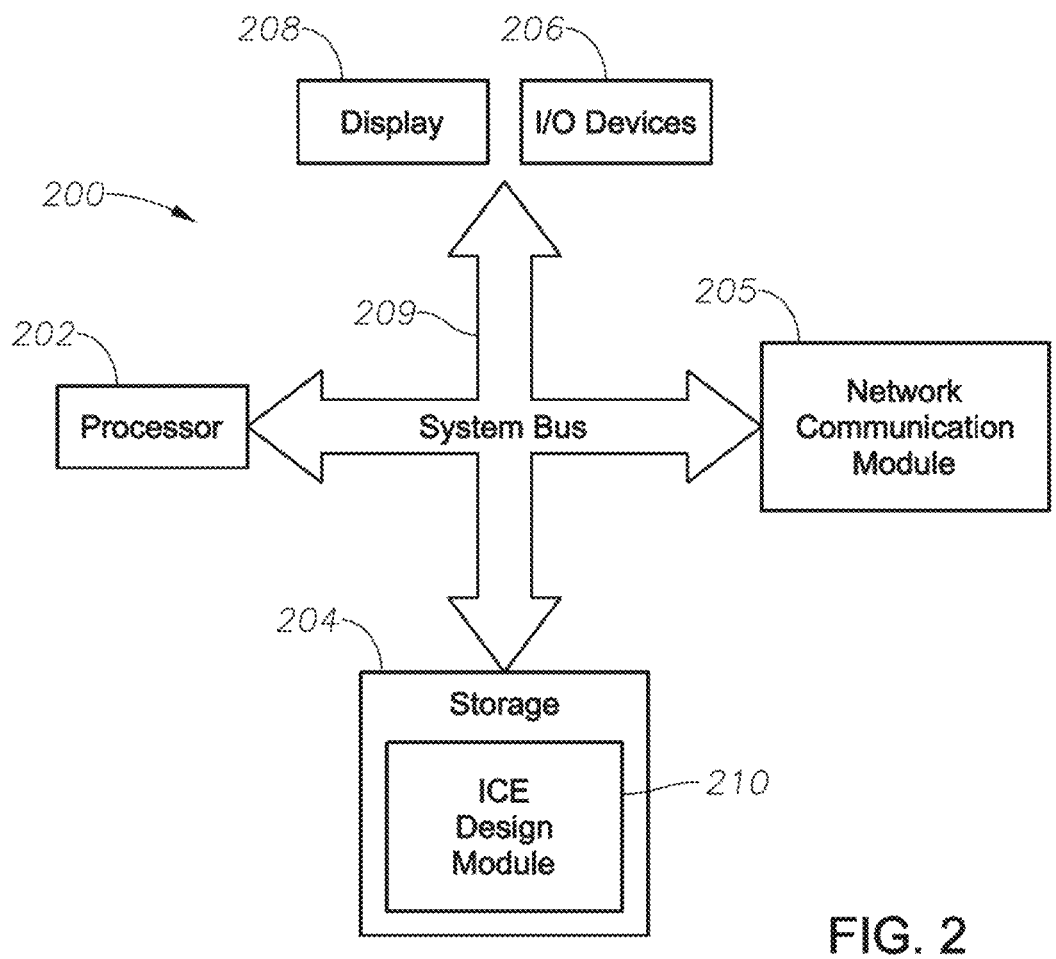
FIG. 2 illustrates a block diagram of an ICE structure design system in accordance to an illustrative embodiment of the present disclosure.

In view of the foregoing, FIG. 2 shows a block diagram of an ICE design system according to an illustrative embodiment of the present disclosure. As will be described herein, ICE design system 200 provides a platform for ICE design and analysis to facilitate rapid and efficient selection of two or more ICE structures having desired spectral patterns. Illustrative embodiments of ICE design system 200 described herein utilize PCA decomposition of sample training spectra as a basis from which to design ICE structures having spectral patters matching the PCA loading vectors. After the selected ICE structures have been designed, fabricated and integrated into an optical computing device, the spectral pattern of an unknown sample can be reconstructed using a linear combination of the ICE structures spectral output weighted by the responses of each ICE structure's corresponding detector. Thus, as described herein, the present disclosure provides high resolution measurements of fluid samples using a simple and rugged optical design.

Referring to FIG. 2, ICE design system 200 includes at least one processor 202, a non-transitory, computer-readable storage 204, transceiver/network communication module 205, optional I/O devices 206, and an optional display 208 (e.g., user interface), all interconnected via a system bus 209. In one embodiment, the network communication module 205 is a network interface card (NIC) and communicates using the Ethernet protocol. In other embodiment, the network communication module 105 may be another type of communication interface such as a fiber optic interface and may communicate using a number of different communication protocols. Software instructions executable by the processor 202 for implementing software instructions stored within ICE design module 210 in accordance with the illustrative embodiments described herein, may be stored in storage 204 or some other computer-readable medium.

Although not explicitly shown in FIG. 2, it will be recognized that ICE design system 200 may be connected to one or more public (e.g., the Internet) and/or private networks via one or more appropriate network connections. It will also be recognized that the software instructions comprising ICE design optimization module 210 may also be loaded into storage 204 from a CD-ROM or other appropriate storage media via wired or wireless methods.

Moreover, methods and embodiments of this disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The methods and embodiments of this disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Figure 3:
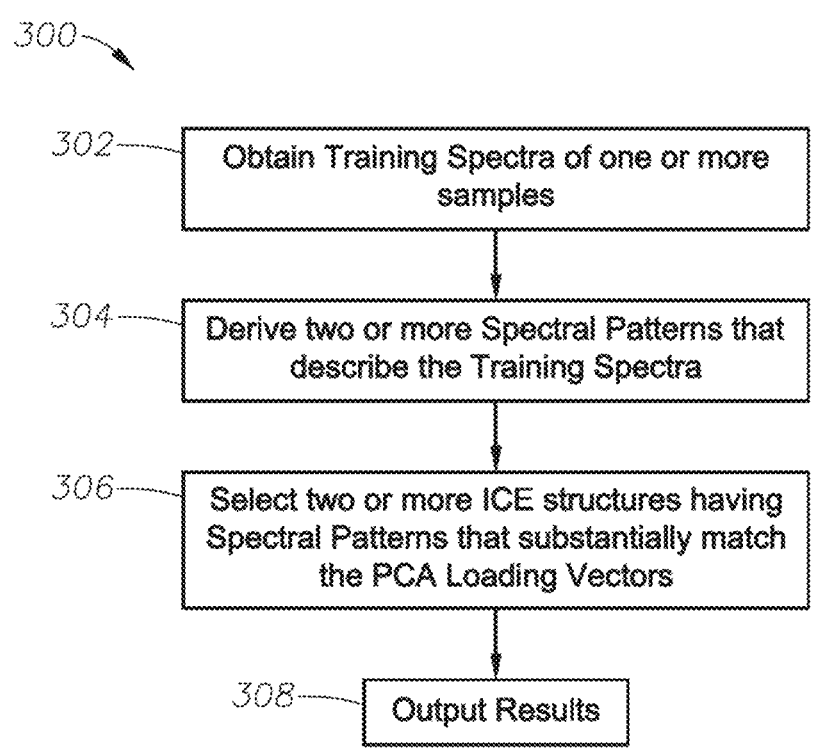
FIG. 3 is a flow chart of a method to design an ICE structure, according to certain illustrative methods of the present disclosure.

Referring to FIG. 3, an illustrative method 300 of the present disclosure will now be described. As previously stated, illustrative embodiments of ICE design method 300 are utilized to design a set of ICE structures whose transmission spectral patterns match predefined spectral patterns, such as, for example, PCA loading vectors. During operation, at least two ICE structures are used to combinatorily reconstruct high resolution spectral data of unknown samples, whereby the high resolution spectral data is utilized to determine, for example, the optical density or composition of the sample.

Figure 4:
FIG. 4 is a graph plotting the transmittance for a variety of training spectra along a bandwidth of 0-650 nm.

At block 302, ICE design system 200, through use of laboratory spectrometer system, obtains high resolution training spectra of one or more samples that are similar to the samples to be measured by the fabricated ICE structures. FIG. 4 is a graph plotting the transmittance for a variety of training spectra along a bandwidth of 450-1100 nm. As defined herein, the training spectra of the samples are optical spectra data acquired on fluid samples using an optical spectrometer, which will be utilized for spectra reconstruction. The sample training spectra obtained at block 300 may be obtained using a laboratory high-resolution instrument, such as, for example, a UV-Vis (UltraViolet-Visible) spectrometer or NIR (near infrared) spectrometer. Although only the visible spectrum is shown in FIG. 4, the training spectra may also be obtained in the infrared spectra region (i.e., ~1100-5000 nm). As used herein, "high resolution" refers to the spectra with spectral resolution of 1 nm or better.

At block 304, using the training spectra, ICE design system 200 then derives two or more spectral patterns describing the training spectra. In this illustrative method, the spectral patterns are PCA loading vectors derived using PCA. In order to calculate such values, ICE design system 200 performs a PCA analysis on the training spectra in order to obtain principal component scores and loading vectors for all spectra using the following:

$$X = S \cdot T + e \quad \text{Eq.(1)},$$

where X is the training spectral data matrix, S is the PCA score, T is the PCA loading vector, and e is the residual error for each spectrum in the training spectra through PCA decomposition. The S and T are obtained simultaneously, whereby the PCA loading vectors (T) are then obtained.

Figure 5:
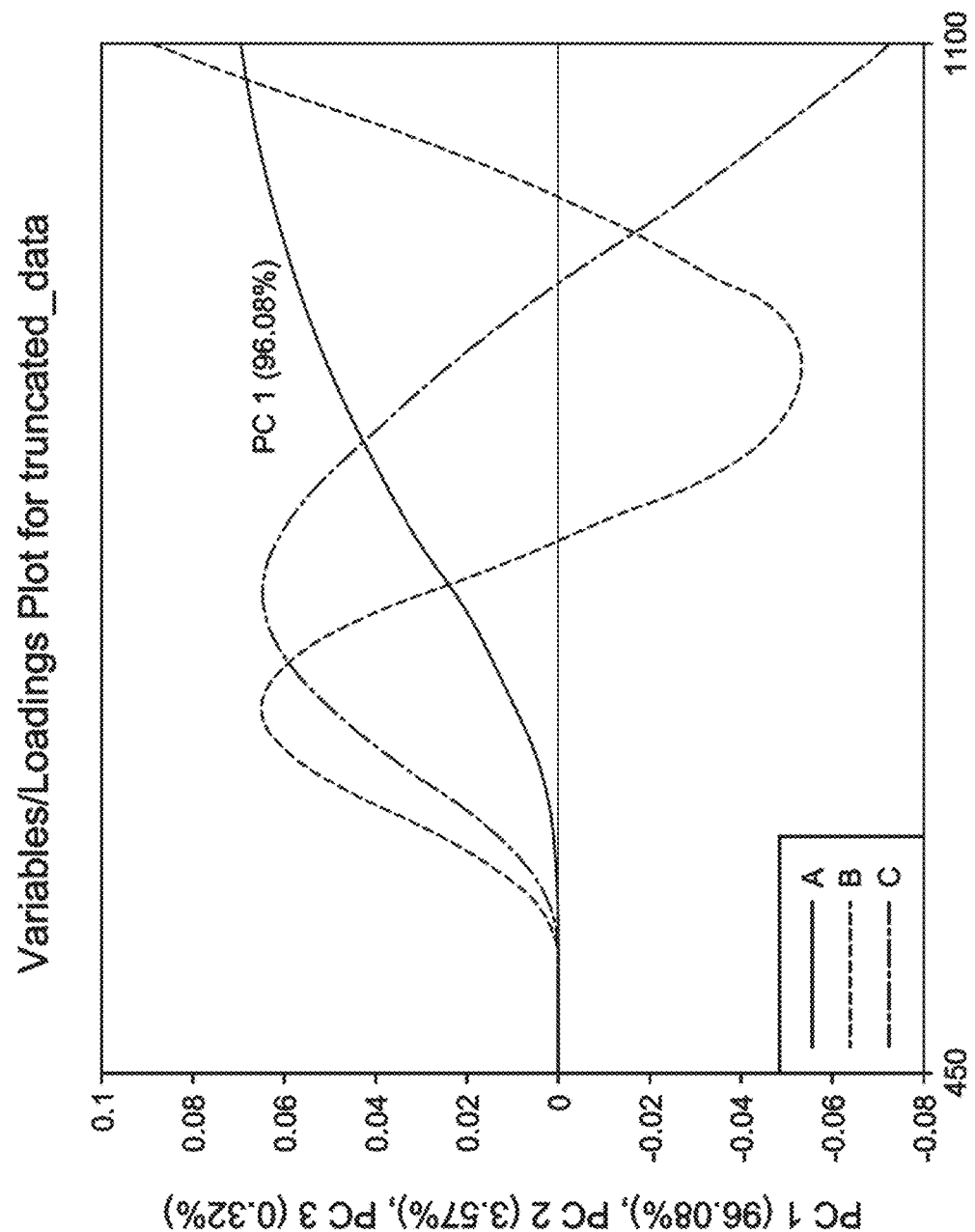
FIG. 5 is a graph plotting three PCA loading vectors A, B and C utilized to design the ICE structures, according to certain illustrative methods of the present disclosure.

FIG. 5 is a graph plotting the best three PCA loading vectors A, B and C calculated using Equation 1. The X axis is the wavelength in nanometer, and the Y axis is the transmission %. The top three loading vectors were selected in this example because the three loading vectors are the first three principal components which capture the largest variation of training spectral data. However, in alternate methods, more or less than three PCA loading vectors may be selected dependent upon the number of ICE structures (and, thus, resolution level/number of optical channels available in the downhole sensor) desired.

Furthermore, in the example of FIG. 5, four ICE structures are designed because the one additional ICE structure is needed to mimic the negative portion of PCA loading vector B. In this case, one ICE structure will be used to mimic the positive portion of PCA loading vector B, and another ICE structure will used to mimic the negative portion of PCA loading vector B. Since all ICE spectral patterns are positive, the second ICE structure is really mimicking the flipped pattern of the negative portion (i.e., flipped to make negative pattern become positive pattern).

Nevertheless, once the PCA loading vectors are calculated at block 304, they are then used to select/design two or more ICE structures whose spectral patterns match the PCA loading vectors at block 306. Since four PCA loading vectors (including the flipped negative component of vector B) were selected in FIG. 5, four ICE structures are selected at block 306. Here, ICE design system 200 selects four ICE structure designs having transmission spectral patterns that match the spectral patterns of the PCA loading vectors, and the design results may be output as desired.

In certain methods, the spectrum matching process includes the following: first, a number of random designs are provided as seed designs. Key design parameters include number of thin film layers and thickness of each layer. By optimizing the number of layers and thicknesses of each layer, the difference between the spectral pattern of the design and target pattern (PCA loading) will be minimized. Then, the optimized design is the design chosen to be fabricated. The spectral pattern does not need to match exactly, as small deviations of patterns will not impact the spectra reconstruction result.

Because the principal components are orthogonal to each other, the amount of variance captured by each principal component decreases. As a result, PCA provides the fewest components which accurately describe the spectral data. Physically, from an ICE design perspective, the results in fewer ICE structures necessary to measure the sample and accurately reconstruct its spectral pattern. Nevertheless, once the ICE structures have been designed, the selected ICE structures may then be fabricated and integrated into an optical computing device. Fabrication of the broadband ICE structures can be achieved by depositing the thin film material using a variety of deposition techniques, as previously described. Once fabricated, the ICE structures may then be integrated into an optical computing device.

Figure 6:
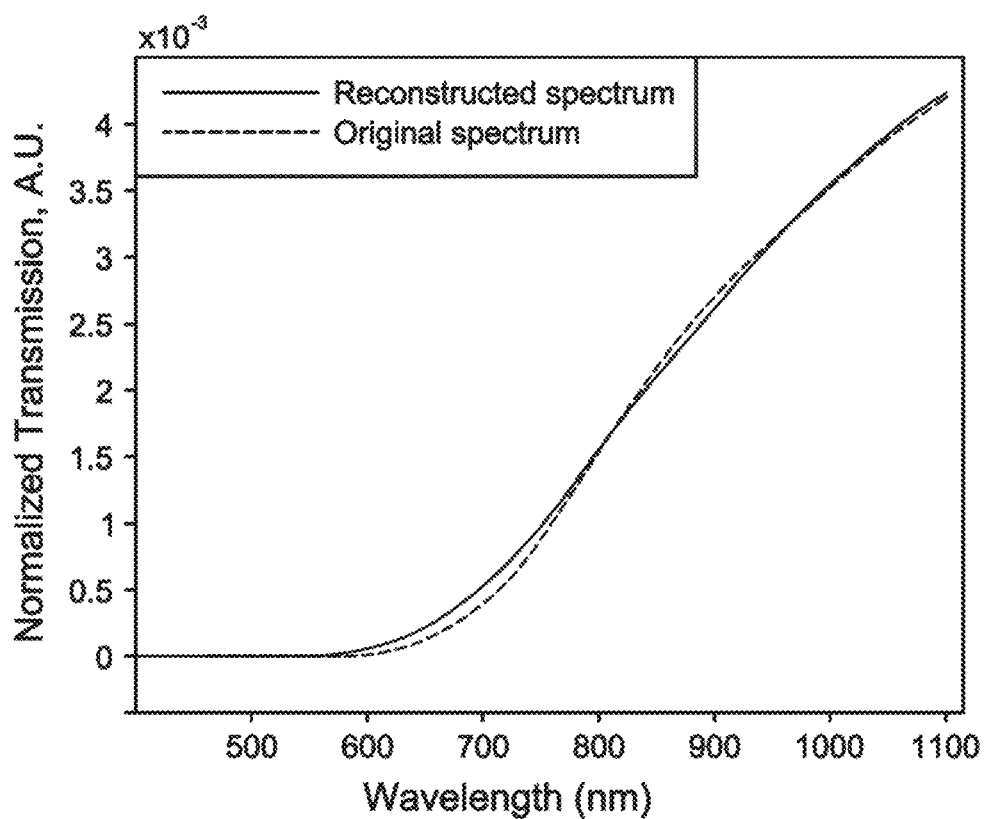
FIG. 6 is a graph showing a normalized comparison of the original transmission spectral pattern of the sample vs. the transmission spectral pattern reconstructed using ICE structures described herein.

During operation of the optical computing devices, the reconstructed spectral patterns of the unknown samples can be obtained using a linear combination of the spectral patterns of two or more ICE structures, weighted by the detector responses of each ICE structure, using the following:

$$\hat{Z} = D \cdot T \quad \text{Eq.(2)},$$

where $\hat{Z}$ is the reconstructed sample spectral pattern, T is the transmission spectral pattern of the ICE structures (which match the PCA loading vectors), and D is the detector responses of each ICE structure. FIG. 6 is a graph showing a normalized comparison of the original transmission spectral pattern of the sample vs. the transmission spectral pattern reconstructed using the principal components of FIG. 5 along the visible and short-near infrared spectral ranges. As can be seen, there is a high degree of accuracy in the disclosed design method.

Figure 7:
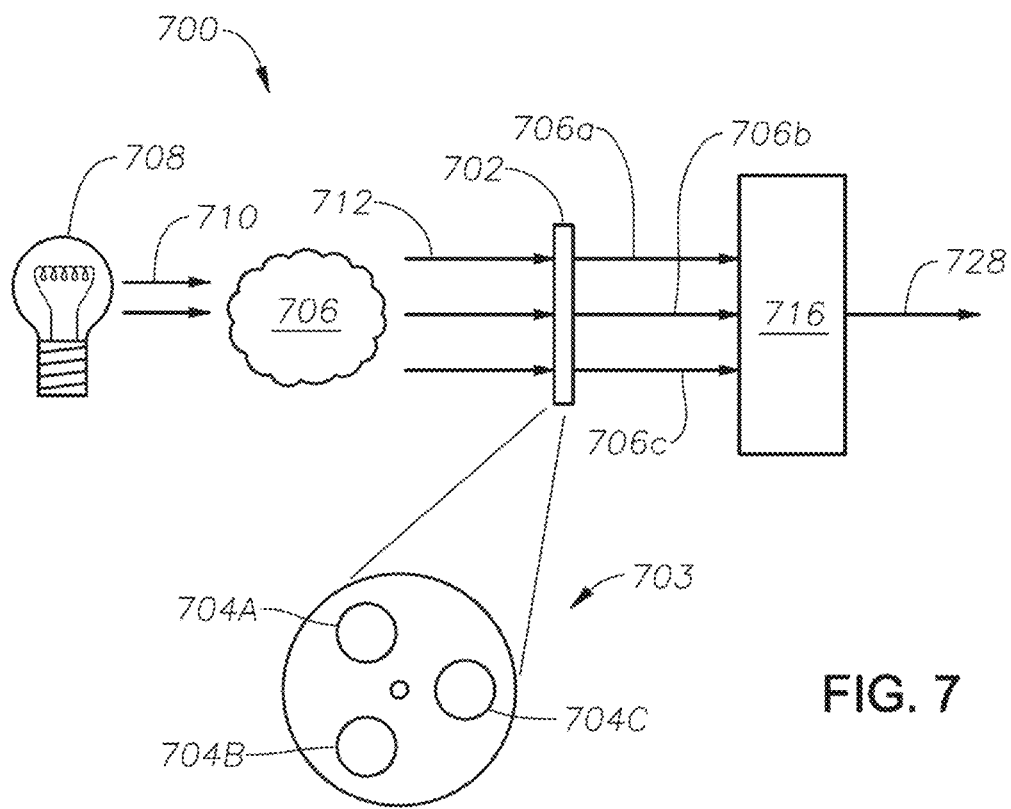
FIG. 7 illustrates a block diagram of an optical computing device used to interrogate a sample, according to certain illustrative embodiments of the present disclosure.

FIG. 7 illustrates a block diagram of an optical computing device 700 used to interrogate a sample, according to certain illustrative embodiments of the present disclosure. An electromagnetic radiation source 708 may be configured to emit or otherwise generate electromagnetic radiation 710. As understood in the art, electromagnetic radiation source 708 may be any device capable of emitting or generating electromagnetic radiation. For example, electromagnetic radiation source 708 may be a light bulb, light emitting device, laser, blackbody, photonic crystal, or X-Ray source, etc. In one embodiment, electromagnetic radiation 710 may be configured to optically interact with the sample 706 (wellbore fluid flowing through a wellbore or a portion of the formation, for example) and generate sample-interacted light 712. Sample 706 may be any fluid (liquid or gas), solid substance or material such as, for example, downhole tool components, tubulars, rock formations, slurries, sands, muds, drill cuttings, concrete, other solid surfaces, etc. In other embodiments, however, sample 706 is a multiphase wellbore fluid (comprising oil, gas, water, solids, for example) consisting of a variety of fluid characteristics such as, for example, elemental corrosive by-products, elements generated by sample material loss, C1-C4 and higher hydrocarbons, groupings of such elements, and saline water.

Sample 706 may be provided to optical computing device 700 through a flow pipe or sample cell, for example, containing sample 706, whereby it is introduced to electromagnetic radiation 710. While FIG. 7 shows electromagnetic radiation 710 as passing through or incident upon the sample 706 to produce sample-interacted light 712 77), it is also contemplated herein to reflect electromagnetic radiation 710 off of the sample 706 (i.e., reflectance mode), such as in the case of a sample 706 that is translucent, opaque, or solid, and equally generate the sample-interacted light 712.

After being illuminated with electromagnetic radiation 710, sample 706 containing an analyte of interest (a characteristic of the sample, for example) produces an output of electromagnetic radiation (sample-interacted light 712, for example). As previously described, sample-interacted light 712 also contains spectral patterns that reflects characteristics (e.g., density or composition) of the sample. Ultimately, processing circuitry, on board device 700 or remote therefrom, analyzes this spectral information to determine sample characteristics. Although not specifically shown, one or more spectral elements may be employed in optical computing device 700 in order to restrict the optical wavelengths and/or bandwidths of the system and, thereby, eliminate unwanted electromagnetic radiation existing in wavelength regions that have no importance. Such spectral elements can be located anywhere along the optical train, but are typically employed directly after the light source which provides the initial electromagnetic radiation.

Optical computing device 700 may include a movable assembly 702 having at least two ICE structures 704. In this example, three ICE structures 704A, B, and C are shown. As illustrated, the movable assembly 702 may be characterized at least in one embodiment as a rotating disc 703, such as, for example, a chopper wheel, wherein ICE structures 704A,B,C are radially disposed for rotation therewith. FIG. 7 also illustrates corresponding frontal views of the moveable assembly 702, which is described in more detail below. In other embodiments, however, movable assembly 702 may be characterized as any type of movable assembly configured to sequentially align at least one detector with optically interacted light and/or the two or more ICE structures 704A,B,C. Each ICE structures 704A,B,C may be any of those designed herein, and configured to combinatorily reconstruct the spectral pattern of sample 706. Although three ICE structures 704A,B,C are described, two or more may be employed along movable assembly 702 as desired.

In certain exemplary embodiments, rotating disc 703 may be rotated at a desired frequency. In operation, rotating disc 703 may rotate such that ICE structures 704A,B,C may each be exposed to or otherwise optically interact with the sample-interacted light 712 for a distinct brief period of time. Upon optically interacting with the sample-interacted light 712, ICE structure 704A is configured to generate optically interacted light 706a, ICE structures 704B is configured to generate a second optically interacted light 706b and optical element 726b is configured to generate a third optically interacted light 706c, wherein each of the optically-interacted lights 706a,b,c have spectral patterns that match the PCA loading vectors, as described herein. Detector 716 then receives each beam 706a-c and thereby generates a first, second and third output signal, respectively (output signal 728 comprises the first, second and third signals). Accordingly, a signal processor (not shown) communicatively coupled to detector 716 weights and combines all three of the output signals in order to reconstruct the spectral pattern of sample 706. The signal processor may then utilize the reconstructed spectral pattern to determine a variety of sample characteristics including, for example, the optical density or fluid composition of the sample.

Those ordinarily skilled in the art having the benefit of this disclosure realize the aforementioned optical computing device is illustrative in nature, and that there are a variety of other optical configurations which may be utilized. These optical configurations not only include the reflection, absorption or transmission methods described herein, but can also involve scattering (Raleigh & Raman, for example) as well as emission (fluorescence, X-ray excitation, etc., for example). In addition, the optical computing devices may comprise a parallel processing configuration whereby the sample-interacted light is split into multiple beams. The multiple beams may then simultaneously go through two or more corresponding ICE structures, whereby the transmission spectral pattern of each ICE structure is combined to reconstruct the spectral pattern of the sample. The parallel processing configuration is particularly useful in those applications that require extremely low power or no moving parts.

The illustrative embodiments and associated methods of the optical computing devices described herein may be utilized in a variety of environments. Such environments may include, for example, downhole well or completion applications. Other environments may include those as diverse as those associated with surface and undersea monitoring, satellite or drone surveillance, pipeline monitoring, or even sensors transiting a body cavity such as a digestive tract. Within those environments, the computing devices and temperature sensors are utilized to detect/monitor various sample characteristics within the environment.

Figure 8A:
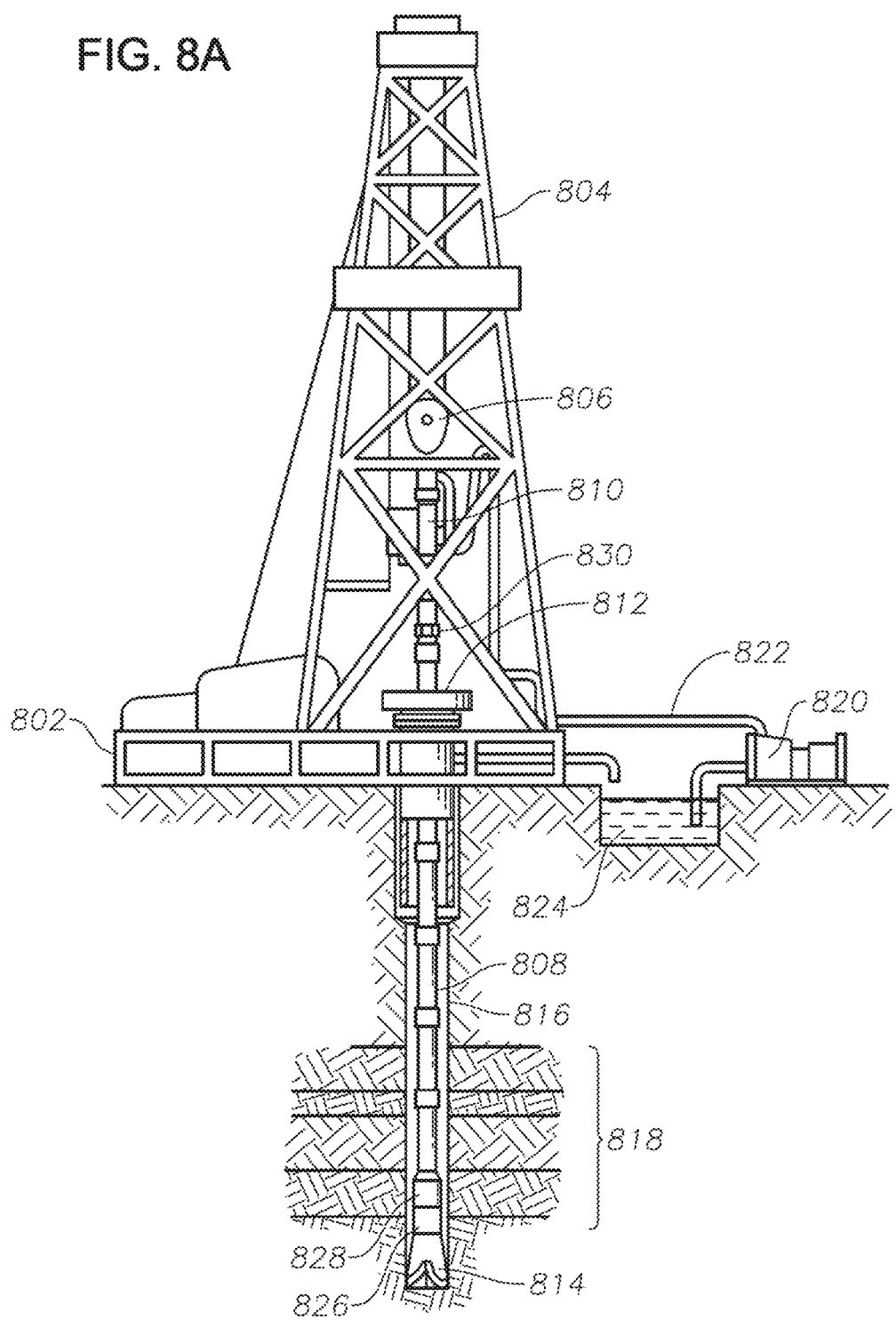
FIGS. 8A and 8B illustrate an optical computing device utilized in a logging-while-drilling application and wireline application, respectively.

FIG. 8A illustrates an optical computing device utilized in a logging-while-drilling ("LWD") application. FIG. 8A illustrates a drilling platform 802 equipped with a derrick 804 that supports a hoist 806 for raising and lowering a drill string 808. Hoist 806 suspends a top drive 810 suitable for rotating drill string 808 and lowering it through well head 812. Connected to the lower end of drill string 808 is a drill bit 814. As drill bit 814 rotates, it creates a wellbore 816 that passes through various layers of a formation 818. A pump 820 circulates 805 drilling fluid through supply pipe 822 to top drive 810, down through the interior of drill string 808, through orifices in drill bit 814, back to the surface via the annulus around drill string 808, and into a retention pit 824. The drilling fluid transports cuttings from the borehole into pit 824 and aids in maintaining the integrity of wellbore 816. Various materials can be used for drilling fluid, 810 including, but not limited to, a salt-water based conductive mud.

A reservoir interrogation system 826 (e.g., optical computing device) is integrated into the bottom-hole assembly near the bit 814. In this illustrative embodiment, reservoir interrogation system 826 is an LWD tool; however, in other illustrative embodiments, reservoir interrogation system 826 may be utilized in a wireline or tubing-conveyed logging application. Nevertheless, as drill bit 814 extends wellbore 816 through formations 818, reservoir interrogation system 826 collects data related to sample characteristics as described herein. In certain embodiments, reservoir interrogation system 826 may take the form of a drill collar, i.e., a thick-walled tubular that provides weight and rigidity to aid the drilling process. A telemetry sub 828 may be included to transfer images and measurement data/signals to a surface receiver 830 and to receive commands from the surface. In some embodiments, telemetry sub 828 does not communicate with the surface, but rather stores data for later retrieval at the surface when the logging assembly is recovered.

Still referring to FIG. 8A, reservoir interrogation system 826 includes a system control center (not shown), along with necessary processing/storage/communication circuitry, that is utilized to acquire sample characteristic and/or temperature measurement signals. In certain embodiments, once the measurement signals are acquired, the system control center calibrates the measurement signals and communicates the data back uphole and/or to other assembly components via telemetry sub 828. In an alternate embodiment, the system control center may be located at a remote location away from reservoir interrogation system 826, such as the surface or in a different borehole, and performs the processing accordingly.

Figure 8B:
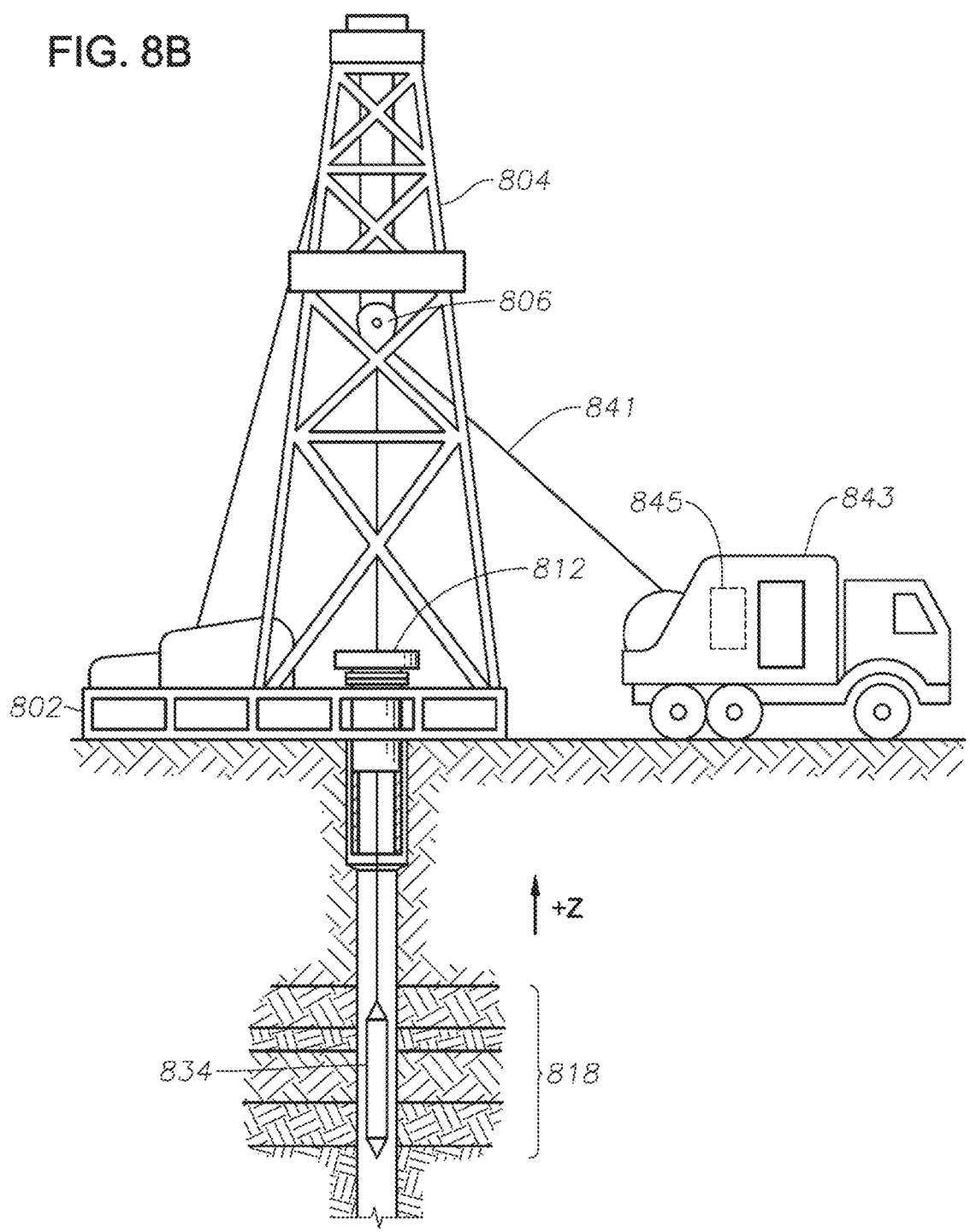

FIG. 8B illustrates an alternative embodiment of the present disclosure whereby the optical computing device is deployed in a wireline application. At various times during the drilling process, drill string 808 may be removed from the borehole as shown in FIG. 8B. Once drill string 808 has been removed, logging operations can be conducted using a wireline logging sonde 834, i.e., a probe suspended by a cable 841 having conductors for transporting power to the sonde and telemetry from the sonde to the surface (forming part of the reservoir interrogation system). Wireline sonde 834 may comprise an optical computing device, as described herein. A wireline logging sonde 834 may have pads and/or centralizing springs to maintain the tool near the axis of the borehole as the tool is pulled uphole. Logging sonde 834 can include a variety of other sensors including tools for measuring formation resistivity. A logging facility 843 collects sample characteristic measurements from the logging sonde 834, and includes a computer system 845 for processing and storing the measurements gathered by the sensors.

Figure 9:
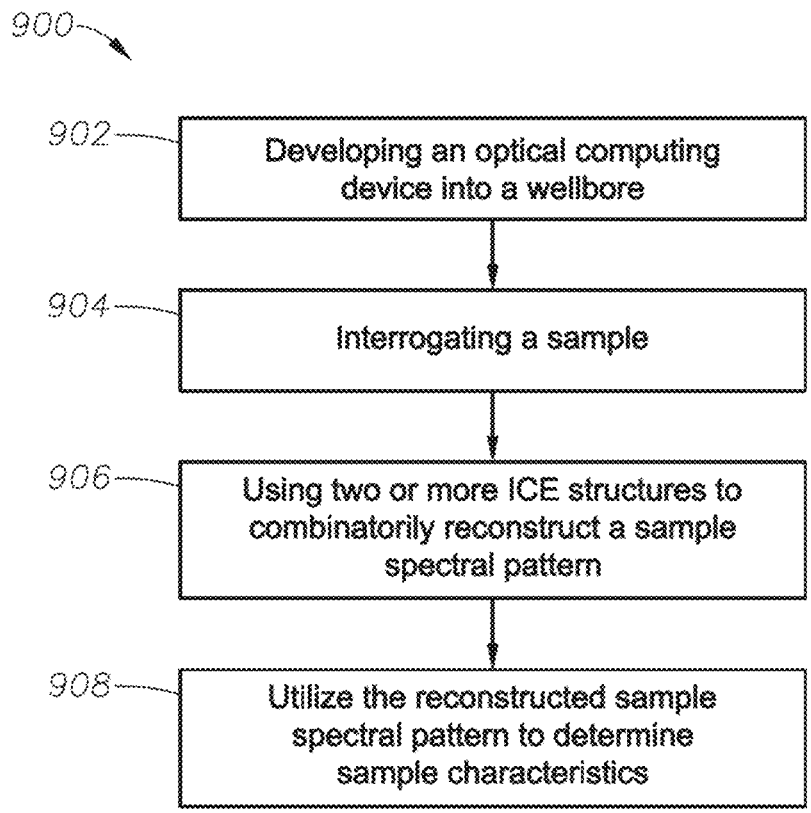
FIG. 9 is a flow chart of an optical computing method, according to certain illustrative methods of the present disclosure.

In view of the foregoing, FIG. 9 is a flow chart of an optical computing method 900, according to certain illustrative methods of the present disclosure. At block 902, an optical computing device, having two or more of the ICE structures designed herein, is deployed into a wellbore. At block 904, the optical computing device is activated to interrogate a downhole spectrum. At block 906, using the combined spectral patterns of the two or more ICE structures, the optical computing device reconstructs the spectral patterns of the sample. At block 908, those reconstructed spectral pattern(s) are then utilized by processing circuitry to determine one or more sample characteristics, such as, for example, optical density or composition of the sample.

Figure 10:
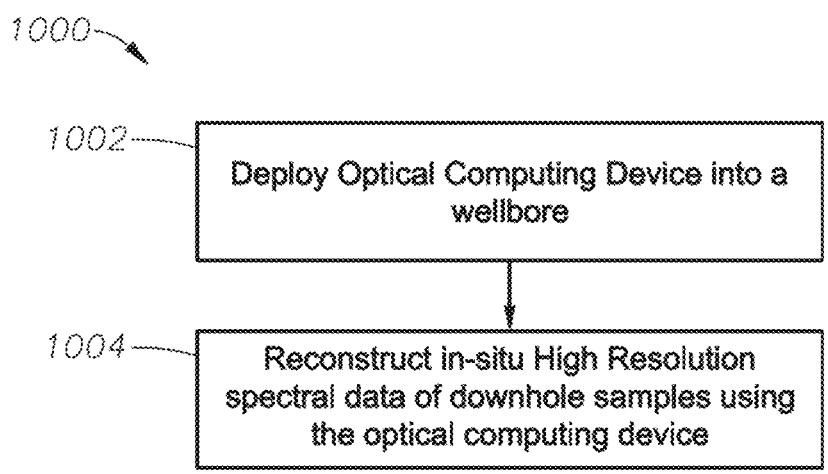
FIG. 10 is a flow chart of an alternative optical computing method, in accordance with certain other illustrative methods of the present disclosure.

FIG. 10 is another flow chart of an optical computing method 1000, in accordance with certain other illustrative methods of the present disclosure. Here, at block 1002, an optical computing device having two or more ICE structures is again deployed into a wellbore using any of the deployment methods deployed herein. At block 1004, the optical computing device then reconstructs in-situ high resolution spectral data of a downhole sample. Here, unlike with prior art device which were only capable of low resolution data, the illustrative embodiments described herein provide high resolution spectral data with spectral resolution of 1 nm or better.

As the sample-interacted light optically interacts with the two or more ICE structures, two or more optically-interacted lights are generated which reflect PCA loading vectors, as shown in FIG. 5. The optically-interacted lights are then detected by the detectors and output signals are communicated to processing circuitry where the output signals are combined to reconstruct the spectral patterns of the sample, as shown in FIG. 6. As can be seen in FIG. 6, the reconstructed spectrum is high resolution because it is reconstructed from a high resolution loading vector, may be utilized to determine a variety of sample characteristics as described herein.

FIG. 6 is also useful to more fully illustrate the definition of "high-resolution" spectral data. In FIG. 6, a reconstructed spectrum for one fluid is shown, with the X axis being its wavelength in nanometers. The spectrum contains 651 data points (transmission values) across the wavelength region of 450 nm to 1100 nm (651 wavelength points). In this case, the spectral resolution is 1 nanometer (i.e., there is one data point per one nm spectral space). If there is more than 651 data points in the same region, the spectral resolution is better than 1 nm (meaning that there is more than one transmission value within one nanometer). For example, if there are 1301 data points within 651 nm spectral region, we define the spectral resolution as 0.5 nm, which is a better spectral resolution than a 1 nm spectral resolution, and so on.

In contrast to FIG. 6, however, conventional downhole tools only provide low resolution spectral data—which is quite different from high resolution spectral data. For example, as shown in the FIG. 6, the spectrum (high resolution) is a very smooth curve. In contrast, low resolution spectra are typically very coarse due to limited number of data points within the same spectra region. Resolution fundamentally means resolving power, i.e., a high number of data points within the same spectra region has a higher resolving power than spectra with low number of data points.

Accordingly, the illustrative methods and embodiments described herein will allow high resolution visible and near infrared spectra to be recording using a downhole optical device. Such spectral data will allow the determination of complex composition and physical properties, such as, for example, asphaltenes and colors. In addition, optical density data at any spectral wavelength from 400-1100 nm may be obtained and compared with other tool data. Also, the obtained density data will allow reservoir connectivity information to be determined.

Embodiments described herein further relate to any one or more of the following paragraphs:

1. A method to design Integrated Computation Element ("ICE") structures, the method comprising obtaining optical training spectra of one or more samples; deriving two or more principal component analysis ("PCA") loading vectors that describe the training spectra; and selecting two or more ICE structures having spectral patterns that substantially match the PCA loading vectors.

2. A method as defined in paragraph 1, wherein obtaining the optical training spectra comprises obtaining high resolution spectra using a spectrometer.

3. A method as defined in paragraphs 1 or 2, wherein obtaining the optical training spectra comprises obtaining the optical training spectra in at least one of a visible or infrared spectral region.

4. A method as defined in any of paragraphs 1-3, further comprising fabricating the selected ICE structures.

5. A method as defined in any of paragraphs 1-4, further comprising integrating the fabricated ICE structures into an optical computing device.

6. An optical computing device comprising a plurality of Integrated Computational Element ("ICE") structures fabricated using any of the methods in paragraphs 1-5.

7. An optical computing method, comprising deploying an optical computing device into a wellbore; and obtaining in-situ high resolution spectral data of downhole samples using the optical computing device.

8. An optical computing method as defined in paragraph 7, wherein obtaining the high resolution spectral data comprises optically interacting electromagnetic radiation with a sample to produce sample-interacted light; optically interacting the sample-interacted light with two or more Integrated Computational Element ("ICE") structures to produce two or more optically-interacted lights having spectral patterns which substantially match predefined principal component analysis ("PCA") loading vectors; and optically interacting the optically-interacted lights with two or more detectors to thereby generate two or more signals that are utilized to combinatorily reconstruct spectral patterns of the sample, wherein the reconstructed spectral patterns comprise the high resolution spectral data.

9. An optical computing method as defined in paragraphs 7 or 8, wherein obtaining the high resolution spectral data of the sample is achieved using a linear combination of high resolution spectral data of Integrated Computational Element ("ICE") structures that are weighted by detector responses associated with each ICE structure.

10. An optical computing method as defined in any of paragraphs 7-9, wherein obtaining the high resolution spectral data of the sample comprises using two or more Integrated Computational Element ("ICE") structures having spectral patterns which substantially match principal component analysis ("PCA") loading vectors.

11. An optical computing method as defined in any of paragraphs 7-10, wherein the high resolution spectral data is utilized to determine an optical density of the samples.

12. An optical computing method as defined in any of paragraphs 7-11, wherein the high resolution spectral data is utilized to determine a composition of the sample.

13. An optical computing method as defined in any of paragraphs 7-12, wherein the optical computing device is deployed using a wireline or drilling assembly.

14. An optical computing method, comprising deploying an optical computing device into a wellbore, the optical computing device comprising two or more Integrated Computational Element ("ICE") structures; interrogating a sample; and utilizing the ICE structures to combinatorily reconstruct a spectral pattern of the sample, wherein data in the spectral pattern may be utilized to determine sample characteristics.

15. An optical computing method as defined in paragraph 14, wherein the data is utilized to determine an optical density of the samples.

16. An optical computing method as defined in paragraphs 14 or 15, wherein the data is utilized to determine a composition of the sample.

17. An optical computing method as defined in any of paragraphs 14-16, wherein the optical computing device is deployed using a wireline or drilling assembly.

18. An optical computing device, comprising: electromagnetic radiation that optically interacts with a sample to produce sample-interacted light; a plurality of Integrated Computational Element ("ICE") structures that optically interact with the sample-interacted light to produce optically-interacted light, wherein the ICE structures comprise spectral patterns that substantially match principal component analysis ("PCA") loading vectors; and a plurality of detectors positioned to optically interact with the optically-interacted light and thereby produce signals which combinatorily reconstruct spectral patterns of the sample.

19. An optical computing device as defined in paragraph 18, wherein the reconstructed spectral patterns of the sample are in at least one of a visible or infrared spectral region.

20. An optical computing device as defined in paragraphs 18 or 19, further comprising a signal processor communicably coupled to the detector to generate the spectral patterns of the sample.

21. An optical computing device as defined in any of paragraphs 18-20, wherein the optical computing device forms part of a wireline or drilling assembly.

Furthermore, the illustrative methodologies described herein may be implemented by a system comprising processing circuitry or a computer program product comprising instructions which, when executed by at least one processor, causes the processor to perform any of the method described herein.

Although various embodiments and methodologies have been shown and described, the disclosure is not limited to such embodiments and methodologies and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method to design Integrated Computation Element ("ICE") structures, the method comprising:
obtaining optical training spectra of one or more samples;
deriving two or more principal component analysis ("PCA") loading vectors that describe the training spectra;
selecting two or more ICE structures having spectral patterns that substantially match the PCA loading vectors; and
fabricating the selected ICE structures.

2. A method as defined in claim 1, wherein obtaining the optical training spectra comprises obtaining high resolution spectra using a spectrometer.

3. A method as defined in claim 1, wherein obtaining the optical training spectra comprises obtaining the optical training spectra in at least one of a visible or infrared spectral region.

4. A method as defined in claim 1, further comprising integrating the fabricated ICE structures into an optical computing device.

5. A system comprising processing circuitry to implement the method of claim 1.

6. A computer program product comprising instructions which, when executed by at least one processor, causes the processor to perform the method of claim 1.

7. An optical computing device comprising a plurality of Integrated Computational Element ("ICE") structures fabricated using the method of claim 1.

8. An optical computing method, comprising:
deploying an optical computing device into a wellbore;
obtaining in-situ high resolution spectral data of downhole samples using the optical computing device,
wherein obtaining the high resolution spectral data comprises:
optically interacting electromagnetic radiation with a sample to produce sample-interacted light; and
optically interacting the sample-interacted light with two or more Integrated Computational Element ("ICE") structures having combined spectral patterns which substantially match predefined principal component analysis ("PCA") loading vectors to produce two or more optically-interacted lights.

9. An optical computing method as defined in claim 8, further comprising:
optically interacting the optically-interacted lights with two or more detectors to thereby generate two or more signals that are utilized to combinatorily reconstruct spectral patterns of the sample, wherein the reconstructed spectral patterns comprise the high resolution spectral data.

10. An optical computing method as defined in claim 8, wherein obtaining the high resolution spectral data of the sample is achieved using a linear combination of high resolution spectral data of Integrated Computational Element ("ICE") structures that are weighted by detector responses associated with each ICE structure.

11. An optical computing method as defined in claim 8, wherein obtaining the high resolution spectral data of the sample comprises using two or more Integrated Computational Element ("ICE") structures having spectral patterns which substantially match principal component analysis ("PCA") loading vectors.

12. An optical computing method as defined in claim 8, wherein:
the high resolution spectral data is utilized to determine an optical density of the samples;
the high resolution spectral data is utilized to determine a composition of the sample; or
the optical computing device is deployed using a wireline or drilling assembly.

13. An optical computing device, comprising:
electromagnetic radiation that optically interacts with a sample to produce sample-interacted light;
a plurality of Integrated Computational Element ("ICE") structures that optically interact with the sample-interacted light to produce optically-interacted light, wherein the ICE structures comprise spectral patterns that substantially match principal component analysis ("PCA") loading vectors; and
a plurality of detectors positioned to optically interact with the optically-interacted light and thereby produce signals which combinatorily reconstruct spectral patterns of the sample.

14. An optical computing device as defined in claim 13, wherein:
the reconstructed spectral patterns of the sample are in at least one of a visible or infrared spectral region; or
the device further comprises a signal processor communicably coupled to the detector to generate the spectral patterns of the sample.

15. An optical computing device as defined in claim 13, wherein the optical computing device forms part of a wireline or drilling assembly.

* * * * *